United States Patent
Wang

(10) Patent No.: US 12,327,339 B2
(45) Date of Patent: Jun. 10, 2025

(54) METHOD AND APPARATUS FOR CORRECTING FACE DISTORTION, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Yun Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 360 days.

(21) Appl. No.: 17/835,728

(22) Filed: Jun. 8, 2022

(65) Prior Publication Data

US 2022/0301121 A1 Sep. 22, 2022

Related U.S. Application Data

(63) Continuation of application No. PCT/CN2020/127551, filed on Nov. 9, 2020.

(30) Foreign Application Priority Data

Dec. 9, 2019 (CN) .......................... 201911252854.8

(51) Int. Cl.
*G06T 5/80* (2024.01)
*G06T 7/70* (2017.01)
*G06V 40/16* (2022.01)

(52) U.S. Cl.
CPC .................. *G06T 5/80* (2024.01); *G06T 7/70* (2017.01); *G06V 40/161* (2022.01); *G06T 2207/30201* (2013.01)

(58) Field of Classification Search
CPC ... G06T 5/80; G06T 2207/30201; G06T 3/00; G06T 7/70; G06V 40/161–40/167; G06V 10/24
See application file for complete search history.

(56) References Cited

U.S. PATENT DOCUMENTS

2005/0063566 A1* 3/2005 Beek .................... A61B 5/0059
348/E7.086
2008/0239107 A1 10/2008 Cho
(Continued)

FOREIGN PATENT DOCUMENTS

| CN | 104469137 A | 3/2015 |
| CN | 104994281 A | 10/2015 |

(Continued)

OTHER PUBLICATIONS

International Search Report and Written Opinion dated Feb. 18, 2021 in International Application No. PCT/CN2020/127551. English translation attached.
(Continued)

*Primary Examiner* — Zhiyu Lu
(74) *Attorney, Agent, or Firm* — Sheppard, Mullin, Richter & Hampton LLP

(57) ABSTRACT

The present disclosure provides a method for correcting face distortion, an apparatus for correcting face distortion, an electronic device, and a storage medium. The method includes: performing face detection on an obtained image to determine a position of each face box included in the image; determining whether each face box is within a predetermined field of view range based on the position of the face box; and performing distortion correction on a face in a first face box in response to at least a part of the first face box being not within the predetermined field of view range, to generate a corrected image.

14 Claims, 3 Drawing Sheets

(56) References Cited

U.S. PATENT DOCUMENTS

| | | | | |
|---|---|---|---|---|
| 2013/0265383 | A1* | 10/2013 | Yamashita | G06V 40/161 348/14.08 |
| 2015/0086132 | A1 | 3/2015 | Tsukagoshi | |
| 2019/0102868 | A1 | 4/2019 | Beric et al. | |
| 2021/0035307 | A1* | 2/2021 | Shih | G06T 7/174 |

FOREIGN PATENT DOCUMENTS

| | | | |
|---|---|---|---|
| CN | 105405104 | A | 3/2016 |
| CN | 104994281 | B | 9/2017 |
| CN | 107451965 | A | 12/2017 |
| CN | 105554403 | B | 12/2018 |
| CN | 108932698 | A | 12/2018 |
| CN | 109948397 | A | 6/2019 |
| CN | 110232667 | A | 9/2019 |
| CN | 111105367 | A | 5/2020 |
| EP | 2650841 | A2 | 10/2013 |
| EP | 2650841 | A3 | 7/2017 |
| JP | 3596996 | * 12/2004 | ............. A61B 5/117 |
| JP | 2007036359 | A | 2/2007 |
| JP | 2014179937 | A | 9/2014 |
| KR | 20190060228 | A | 6/2019 |
| WO | 2018120011 | A1 | 7/2018 |

OTHER PUBLICATIONS

First Office Action from corresponding Chinese Application No. 201911252854.8, dated Jan. 12, 2023 . English translation attached.
Extended European Search Report dated Apr. 24, 2023 received in European Patent Application No. EP20900298.9.
Grant Notice & Supplementary Search from corresponding Chinese Application No. 201911252854.8, dated Jun. 19, 2023 . English translation attached.

* cited by examiner

METHOD AND APPARATUS FOR CORRECTING FACE DISTORTION, ELECTRONIC DEVICE, AND STORAGE MEDIUM

CROSS-REFERENCE TO RELATED APPLICATION

The present application is a continuation of International Application No. PCT/CN2020/127551, filed on Nov. 9, 2020, which claims priority to Chinese Patent Application No. 201911252854.8, filed with the CNIPA on Dec. 9, 2019, which is incorporated herein by reference in its entirety.

TECHNICAL FIELD

The present disclosure relates to image processing technology, and more particularly, to a method and apparatus for correcting face distortion, an electronic device, and a storage medium.

BACKGROUND

When a user uses an electronic device with a camera to take a picture, a deformation of a face near an edge of the image will occur, which is a perspective deformation caused by a perspective projection during the imaging process of the camera. A perspective deformation refers to a case where an object and its surrounding area are completely different from what they look like in a standard lens, with bending or deformation due to changes in the relative proportions between near features and far features.

SUMMARY

The present disclosure provides a method and apparatus for correcting face distortion, an electronic device, and a storage medium, capable of solving the problem in the related art associated with a serious perspective deformation of a face at an edge of an image captured by a camera with a large field of view, which would affect the user experience.

In an aspect, a method for correcting face distortion is provided according to embodiments of the present disclosure. The method includes: performing face detection on an obtained image to determine a position of each face box included in the image; determining whether each face box is within a predetermined field of view range based on the position of the face box; and performing distortion correction on a face in a first face box in response to at least a part of the first face box being not within the predetermined field of view range, to generate a corrected image.

In another aspect, an apparatus for correcting face distortion is provided according to embodiments of the present disclosure. The apparatus includes: a first determining module configured to perform face detection on an obtained image to determine a position of each face box included in the image; a determining module configured to determine whether each face box is within a predetermined field of view range based on the position of the face box; and a correcting module configured to perform distortion correction on a face in a first face box in response to at least a part of the first face box being not within the predetermined field of view range, to generate a corrected image.

In yet another aspect, an electronic device is provided according to embodiments of the present disclosure. The electronic device includes: a memory, a processor, and a program stored in the memory and executable on the processor. The processor is configured to, when executing the program: perform face detection on an obtained image to determine a position of each face box included in the image; determine whether each face box is within a predetermined field of view range based on the position of the face box; and perform distortion correction on a face in a first face box in response to at least a part of the first face box being not within the predetermined field of view range, to generate a corrected image.

In still another aspect, a computer-readable storage medium is provided according to embodiments of the present disclosure. The computer-readable storage medium having a computer program stored thereon. The computer program, when executed by a processor, implements a method for correcting face distortion. The method includes: performing face detection on an obtained image to determine a position of each face box included in the image; determining whether each face box is within a predetermined field of view range based on the position of the face box; and performing distortion correction on a face in a first face box in response to at least a part of the first face box being not within the predetermined field of view range, to generate a corrected image.

In still yet another aspect, a computer program is provided according to embodiments of the present disclosure. The computer program, when executed by a processor, implements a method for correcting face distortion. The method includes: performing face detection on an obtained image to determine a position of each face box included in the image; determining whether each face box is within a predetermined field of view range based on the position of the face box; and performing distortion correction on a face in a first face box in response to at least a part of the first face box being not within the predetermined field of view range, to generate a corrected image.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the following accompanying drawings.

DESCRIPTION OF EMBODIMENTS

Figure 1:
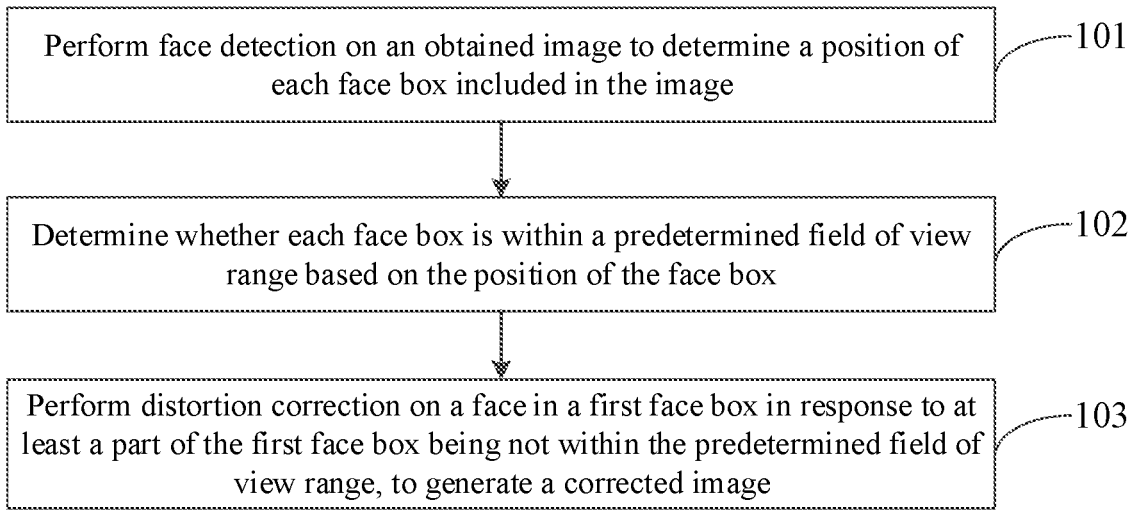
FIG. 1 is a schematic flowchart illustrating a method for correcting face distortion according to embodiments of the present disclosure.

The embodiments of the present disclosure will be described in detail below with reference to examples thereof as illustrated in the accompanying drawings, throughout which same or similar elements are denoted by same or similar reference numerals. The embodiments described below with reference to the drawings are illustrative only, and are intended to explain, rather than limiting, the present disclosure.

Referring to FIG. 1, a method for correcting face distortion according to embodiments of the present disclosure includes: performing face detection on an obtained image to determine a position of each face box included in the image; determining whether each face box is within a predetermined field of view range based on the position of the face box; and performing distortion correction on a face in a first face box in response to at least a part of the first face box being not within the predetermined field of view range, to generate a corrected image.

Figure 2:
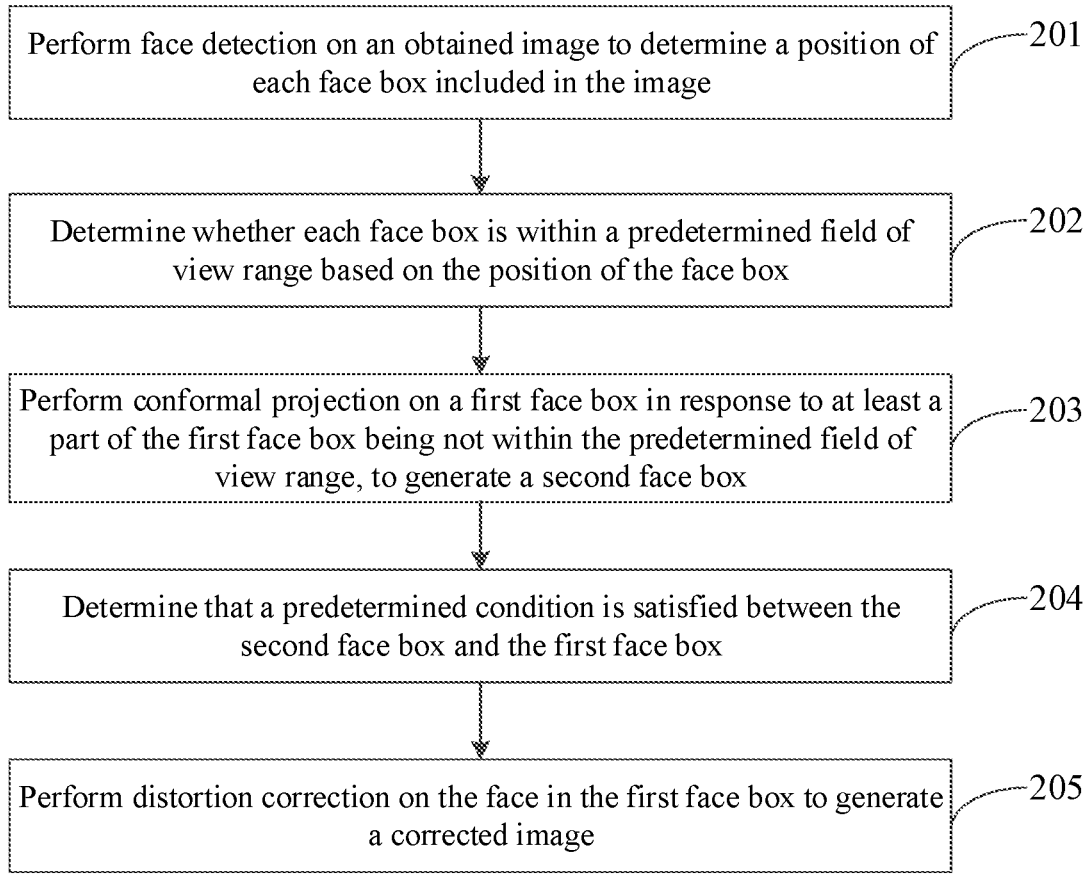
FIG. 2 is a schematic flowchart illustrating another method for correcting face distortion according to embodiments of the present disclosure.

Referring to FIG. 2, in some embodiments, prior to performing the distortion correction on the face in the first face box, the method for correcting face distortion may further include: performing conformal projection on the first face box to generate a second face box; and determining that a predetermined condition is satisfied between the second face box and the first face box.

In some embodiments, the operation of determining that the predetermined condition is satisfied between the second face box and the first face box may include: determining that a length of at least one side in the second face box and a length of a corresponding side in the first face box satisfy the predetermined condition.

In some embodiments, the method may further include, prior to determining whether each face box is within the predetermined field of view range: determining the predetermined field of view range based on attributes of a camera module that captures the image, the attributes of the camera module including a position of the camera module in the terminal and a field of view of the camera module.

Figure 3:
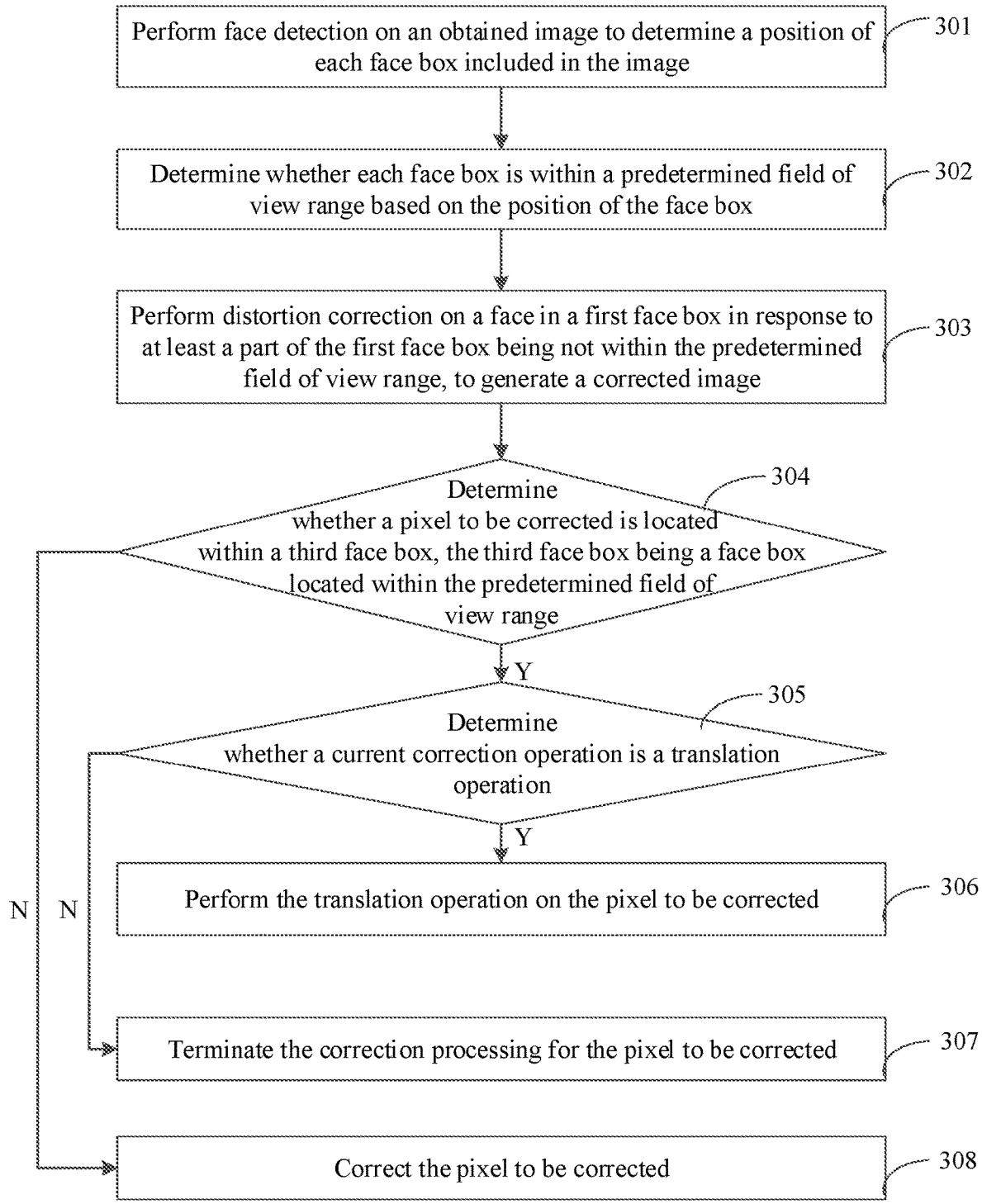
FIG. 3 is a schematic flowchart illustrating yet another method for correcting face distortion according to embodiments of the present disclosure.

Referring to FIG. 3, in some embodiments, the operation of performing the distortion correction on the face in the first face box may include: determining whether a pixel to be corrected is located within a third face box, the third face box being a face box located within the predetermined field of view range; determining whether a current correction operation is a translation operation in response to the pixel to be corrected being located within the third face box; and translating the pixel to be corrected in response to the current correction operation being the translation operation.

Referring to FIG. 3, in some embodiments, the method may further include, subsequent to determining whether the pixel to be corrected is located within the third face box: correcting the pixel to be corrected in response to the pixel to be corrected being not located within the third face box.

Referring to FIG. 3, in some embodiments, the method may further include, subsequent to determining whether the current correction operation is the translation operation: terminating, in response to the current correction operation being not the translation operation, the correction processing for the pixel to be corrected.

Figure 4:
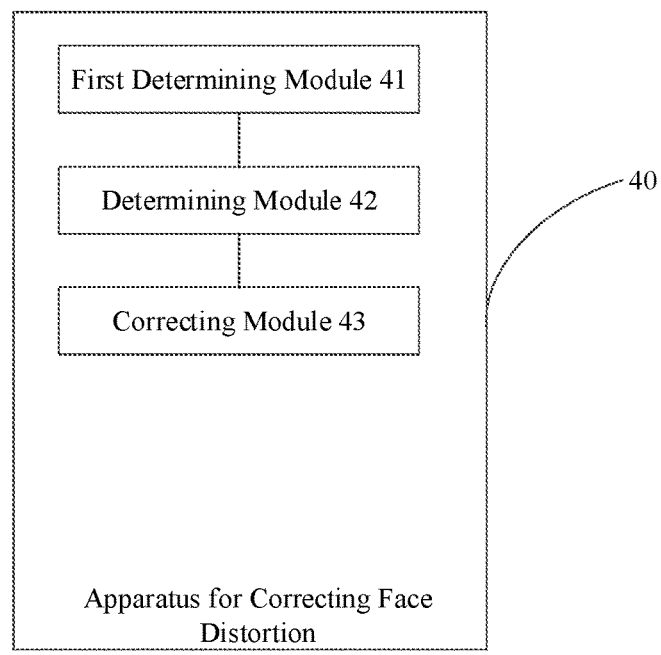
FIG. 4 is a schematic diagram showing a structure of an apparatus for correcting face distortion according to embodiments of the present disclosure.

Referring to FIG. 4, an apparatus 40 for correcting face distortion according to embodiments of the present disclosure includes: a first determining module 41 configured to perform face detection on an obtained image to determine a position of each face box included in the image; a determining module 42 configured to determine whether each face box is within a predetermined field of view range based on the position of the face box; and a correcting module 43 configured to perform distortion correction on a face in a first face box in response to at least a part of the first face box being not within the predetermined field of view range, to generate a corrected image.

Referring to FIG. 4, in some embodiments, the apparatus 40 for correcting face distortion may further include: a projecting module configured to perform conformal projection on the first face box to generate a second face box; and a second determining module configured to determine that a predetermined condition is satisfied between the second face box and the first face box.

In some embodiments, the second determining module may be further configured to determine that a length of at least one side in the second face box and a length of a corresponding side in the first face box satisfy the predetermined condition.

Referring to FIG. 4, in some embodiments, the apparatus 40 for correcting face distortion may further include: a third determining module configured to determine the predetermined field of view range based on attributes of a camera module that captures the image, the attributes of the camera module including a position of the camera module in the terminal and a field of view of the camera module.

Referring to FIG. 4, in some embodiments, the correcting module 43 may be further configured to correct the pixel to be corrected in response to the pixel to be corrected being not located within the third face box.

In some embodiments, the correcting module 43 is further configured to terminate the correction processing for the pixel to be corrected in response to the current correction operation being not the translation operation.

Figure 5:
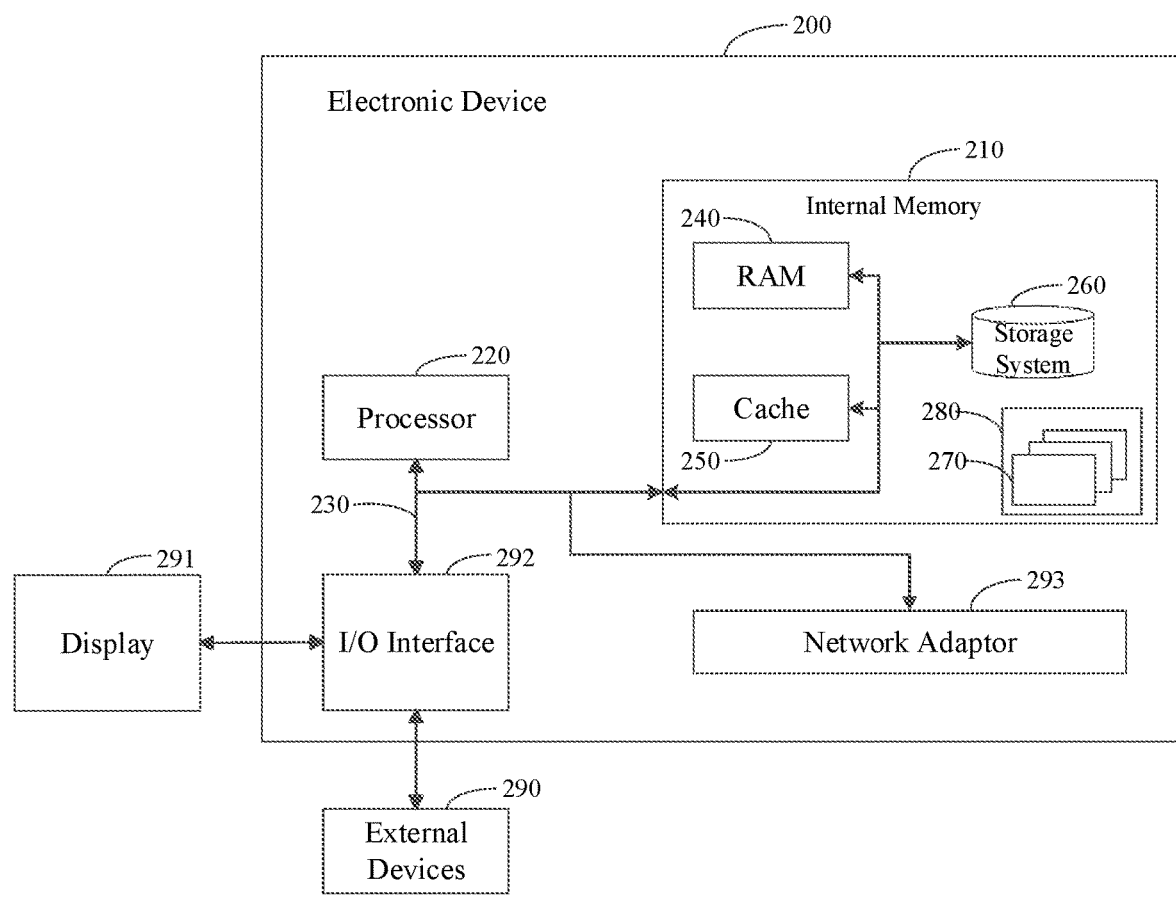
FIG. 5 is a schematic diagram showing a structure of an electronic device according to embodiments of the present disclosure.

Referring to FIG. 5, an electronic device 200 according to embodiments of the present disclosure includes a memory 210, a processor 220, and a program stored in the memory 210 and executable on the processor 220. The processor 220 is configured to, when executing the program: perform face detection on an obtained image to determine a position of each face box included in the image; determine whether each face box is within a predetermined field of view range based on the position of the face box; and perform distortion correction on a face in a first face box in response to at least a part of the first face box being not within the predetermined field of view range, to generate a corrected image.

Referring to FIG. 5, in some embodiments, the processor 220 may be further configured to, when executing the program: perform conformal projection on the first face box to generate a second face box; and determine that a predetermined condition is satisfied between the second face box and the first face box.

Referring to FIG. 5, in some embodiments, the processor 220 may be further configured to, when executing the program: determine that a length of at least one side in the second face box and a length of a corresponding side in the first face box satisfy the predetermined condition.

Referring to FIG. 5, in some embodiments, the processor 220 may be further configured to, when executing the program, before determining whether each face box is within the predetermined field of view range: determine the predetermined field of view range based on attributes of a camera module that captures the image, the attributes of the camera module including a position of the camera module in the terminal and a field of view of the camera module.

Referring to FIG. 5, in some embodiments, the processor 220 may be further configured to, when executing the program: determine whether a pixel to be corrected is located within a third face box, the third face box being a face box located within the predetermined field of view range; determine whether a current correction operation is a translation operation in response to the pixel to be corrected being located within the third face box; and translate the pixel to be corrected in response to the current correction operation being the translation operation.

Referring to FIG. 5, in some embodiments, the processor 220 may be further configured to, when executing the program, after determining whether the pixel to be corrected is located within the third face box: correct the pixel to be corrected in response to the pixel to be corrected being not located within the third face box.

Referring to FIG. 5, in some embodiments, the processor 220 may be further configured to, when executing the program: terminate the correction processing for the pixel to be corrected in response to the current correction operation being not the translation operation.

A computer-readable storage medium according to embodiments of the present disclosure stores a computer program. The program, when executed by a processor, implements the method for correcting face distortion according to any of the above embodiments.

The embodiment of the present disclosure provides a method for correcting face distortion, capable of solving the problem in the related art associated with a serious perspective deformation of a face at an edge of an image captured by a camera with a large field of view, which would affect the user experience.

In the method for correcting face distortion according to the embodiment of the present disclosure, face detection is performed on an obtained image to determine a position of each face box included in the image. It is determined whether each face box is within a predetermined field of view range based on to the position of the face box. Further, in response to at least a part of the first face box being not within the predetermined field of view range, distortion correction is performed on a face in a first face box to generate a corrected image. Therefore, by correcting the face that is not within the predetermined field of view range, the face within the predetermined field of view range can be protected, such that the distorted face can be corrected while protecting the quality of the undistorted face, thereby improving the effect of face distortion correction and improving the user experience.

The method and apparatus for correcting face distortion, the electronic device, the storage medium, and the computer program according to the present disclosure will be described in detail below with reference to the accompanying drawings.

FIG. 1 is a schematic flowchart illustrating a method for correcting face distortion according to embodiments of the present disclosure.

As shown in FIG. 1, the method for correcting face distortion includes the following actions at blocks.

At block 101, face detection is performed on an obtained image to determine a position of each face box included in the image.

It is to be noted that, the method for correcting face distortion of the embodiment of the present disclosure may be performed by the apparatus for correcting face distortion of the embodiment of the present disclosure. The apparatus for correcting face distortion in the embodiment of the present disclosure may be configured in any electronic device having a camera or an image processing function, so as to perform face image distortion correction on an image obtained by the electronic device. Here, the electronic device of the present disclosure may include a mobile phone, a tablet computer, a personal digital assistant, a wearable device, etc., and the present disclosure is not limited to any of these examples.

Here, each face box in the image refers to a box corresponding to a face included in the image. Here, each pixel corresponding to a face is located in the face box corresponding to the face.

It is to be noted that the position of a face box may be represented by the pixel coordinates corresponding to four vertices of the face box in the image.

In the embodiment of the present disclosure, an Artificial Intelligence (AI) face detection algorithm and semantic segmentation of face images may be used to perform face detection on the obtained image to determine the position of each face box in the image.

At block 102, it is determined whether each face box is within a predetermined field of view range based on the position of the face box.

The predetermined field of view range refers to an area in the image where face deformation is not prone to occur, or an image area where face deformation is small and negligible.

As a possible implementation, since the degree of the deformation of the face in the image depends on a distance between a camera module and an object at the time when the object is photographed, and attributes such as a field of view of the camera module, and the like, the predetermined field of view range can be determined based on the attributes of the camera module. That is, in a possible implementation of the embodiment of the present disclosure, prior to the above action at block 102, the method may further include: determining the predetermined field of view range based on attributes of the camera module that captures the image. The attributes of the camera module include a position of the camera module in the terminal and a field of view of the camera module.

Here, the position of the camera module in the terminal may include the camera module being at the front of the terminal and the camera module being at the rear of the terminal. The field of view of the camera module refers to a sight range of the camera module. The larger the sight range of the camera module is, the larger the field of view of the camera module is.

It is to be noted that, the smaller the distance between the camera module and the object to be photographed is, and the larger the field of view of the camera module is, and the more serious the face perspective deformation at the edge of the image will be, such that a reference standard field of view can be determined based on the position of the camera module in the terminal, and then the predetermined field of view range can be determined according to the reference standard field of view and the field of view of the camera module.

Optionally, since the field of view of the standard lens is 40°, for a captured image, pixels within the field of view range of 40° will not cause perspective deformation, and pixels within the field of view range slightly larger than 40° will cause small perspective deformation which is negligible. For example, the perspective deformation caused by pixels within a field of view range of 50° is negligible. Therefore, compared with a rear camera module, when a front camera module is used for capturing an image, the distance between the camera module and the object to be photographed is usually small, resulting in a more serious perspective deformation at the edge of the image (that is, the range of perspective deformation in the image is a relatively large). If it is determined that the position of the camera module in the terminal is "the camera module being at the front of the terminal", the reference standard field of view can be determined as a small value, e.g., the reference standard field of view can be determined as 40°. If it is determined that the position of the camera module in the terminal is "the camera module being at the rear of the terminal", the reference standard field of view can be determined as a large value, e.g., the reference standard field of view can be determined as 50°.

After the reference standard field of view is determined, the predetermined field of view range in the image can be determined according to the field of view of the camera module and the reference standard field of view. That is, the field of view in the image is smaller than or equal to the image area of the reference standard field of view.

For example, if the field of view of the camera module is 70° and the determined reference standard field of view is 50°, then according to the rules of perspective projection, it can be determined that the image area within the field of view range of [0°, 50°] in the image is the predetermined field of view range.

In an embodiment of the present disclosure, after the position of each face box and the predetermined field of view range are determined, it can be determined whether the position of each face box is within the predetermined field of view range.

Optionally, if the position of the face box is represented by pixel coordinates of the four vertices of the face box in the image, it can be determined whether the coordinates of the four vertices of the face box are all within the image area corresponding to the predetermined field of view range. If so, it can be determined that the face box is within the predetermined field of view range. If at least one of the four vertices of the face box is not within the image area corresponding to the predetermined field of view range, it can be determined that a part or all of the face box is not within the predetermined field of view range.

At block 103, distortion correction is performed on a face in a first face box in response to at least a part of the first face box being not within the predetermined field of view range, to generate a corrected image.

The first face box refers to a face box having a part or all not within the predetermined field of view range. That is, the face corresponding to the first face box has a serious perspective deformation.

In an embodiment of the present disclosure, if a part or all of the first face box is not within the predetermined field of view, that is, the face in the first face box may have a serious perspective deformation, then the distortion correction is performed on the face in the first face box to generate a corrected image.

As a possible implementation, conformal projection (such as spherical (stereographic) projection, cylindrical fisheye (Pannini) projection, etc.) can be performed on the face in the first face box, so as to perform distortion correction on the face in the first face box.

Specifically, the face in the first face box can be sparsified into image grids first, and for each face grid corresponding to the face, a conformal projection grid corresponding to the face grid is calculated. Then the face is corrected according to the conformal projection grid corresponding to each face grid, such that the corrected target face grid is consistent with the conformal projection grid corresponding to the face grid. In an embodiment of the present disclosure, an error estimation of the face distortion correction can be determined according to Equation (1), and then according to the relationship between the error estimation and an error threshold, it can be determined whether the corrected target face grid is consistent with the conformal projection grid, i.e., whether the effect of the face distortion correction is ideal.

$$E_u = \Sigma_{i \in k} w_i \|v_i - (S_k u_i + t_k)\|_2^2 \text{"} \qquad (1),$$

where $E_u$ is the error estimation of the face distortion correction, $w_i$ is a weight for the i-th face grid corresponding to the face, and $v_i$ is the target face grid obtained by correcting the i-th face grid corresponding to the face, $S_k$ is a similarity transformation matrix, $u_i$ is the conformal projection grid corresponding to the i-th face grid corresponding to the face, $t_k$ is a translation vector, k is the number of face grids corresponding to the face, and i is an index of the face grids corresponding to the face.

In an embodiment of the present disclosure, if the error estimation $E_u$ of the face distortion correction is smaller than or equal to a first error threshold, it can be determined that the corrected target face grid is consistent with the conformal projection grid, i.e., the effect of the face distortion correction on the face in the first face box is good, such that the process of face distortion correction on the face in the first face box can be terminated. If the error estimation $E_u$ of the face distortion correction is greater than the first error threshold, it can be determined that the corrected target face gird is inconsistent with the conformal projection grid, i.e., the effect of the face distortion correction on the face in the first face box is poor, such that further face distortion correction can be performed on the face in the first face box until the error estimation $E_u$ of the face distortion correction is smaller than or equal to a second error threshold.

It is to be noted that, in practice, the specific value of the first error threshold may be predetermined according to actual needs and specific application scenarios, and the embodiment of the present disclosure is not limited to this.

In the related art, for a camera with a large field of view (such as a wide-angle camera, a mobile phone selfie camera, etc.), the perspective deformation of the face at the edge of the image is more serious, which affects the user experience.

In the method for correcting face distortion according to the embodiment of the present disclosure, face detection is performed on an obtained image to determine a position of each face box included in the image. It is determined whether each face box is within a predetermined field of view range based on the position of the face box. Further, in response to at least a part of the first face box being not within the predetermined field of view range, distortion correction is performed on a face in a first face box to generate a corrected image. Therefore, by correcting the face that is not within the predetermined field of view range, the face within the predetermined field of view range can be protected, such that the distorted face can be corrected while protecting the quality of the undistorted face, thereby improving the effect of face distortion correction and improving the user experience.

In a possible implementation of the present disclosure, the face that is not within the predetermined field of view range may not be deformed, such that according to the degree of deformation of the face in the first face box, a face box that needs to be performed with face distortion correction can be selected from the first face box, so as to further improve the effect of face distortion correction.

In the following, another method for correcting face distortion according to an embodiment of the present disclosure will be explained with reference to FIG. 2.

FIG. 2 is a schematic flowchart illustrating another method for correcting face distortion according to embodiments of the present disclosure.

As shown in FIG. 2, the method for correcting face distortion includes the following actions at blocks.

At block 201, face detection is performed on an obtained image to determine a position of each face box included in the image.

At block 202, it is determined whether each face box is within a predetermined field of view range based on the position of the face box.

For the specific implementation process and principle of the above actions at blocks 201 and 202, reference may be made to the detailed description of the above embodiment, and details thereof will be omitted here.

At block 203, if at least a part of the first face box is not within the predetermined field of view range, conformal projection is performed on the first face box to generate a second face box.

In an embodiment of the present disclosure, if a part or all of the first face box is within the predetermined field of view range, it means that the face in the first face box is very likely to have a perspective deformation. However, it does not mean that all faces in the first face boxes will have obvious perspective deformation. In particular, the first face box having a part not within the predetermined field of view range may have no perspective deformation, or small perspective deformation that is not visible. Therefore, the first face box can be further screened according to the degree of perspective deformation of the face in the first face box, and distortion correction is performed only on the face in the first face box that has the degree of perspective deformation satisfying a condition, so as to further protect the undistorted face and further improve the effect of face distortion correction.

As a possible implementation, since conformal projection has a good effect of correcting the perspective deformation of the face in the image, the conformal projection of the face in the first face box can be used as a reference to determine the degree of perspective deformation of the face in the face box. Therefore, after each first face box included in the image is determined, a face in each first face box can be subjected to conformal projection to generate a second face box corresponding to the first face box.

At block 204, it is determined that a predetermined condition is satisfied between the second face box and the first face box.

In an embodiment of the present disclosure, the predetermined condition that needs to be satisfied by the first face box on which face distortion correction is performed may be determined, such that the first face box allowing the predetermined condition to be satisfied between the first face box and the second face box corresponding to the first face box can be determined, so as to complete the screening process for the first face box.

Optionally, the degree of the perspective deformation of the face in the first face box may be determined based on the difference between the size of the first face box and the size of the second face box. That is, in a possible implementation of the embodiment of the present disclosure, the above block 204 may include: determining that a length of at least one side in the second face box and a length of a corresponding side in the first face box satisfy the predetermined condition.

Here, the predetermined condition may be an absolute value of the difference between the length of the at least one side in the second face box and the length of the corresponding side in the first face box being greater than a difference threshold, or a ratio of the length of the at least one side in the second face box to the length of the corresponding side in the first face box being within a predetermined range, or the like. The embodiment of the present disclosure is not limited to any of these examples.

As a possible implementation, if the length of at least one side in the second face box and the length of the corresponding side in the first face box satisfy the predetermined condition, it can be determined that the face in the first face box has a perspective deformation or a significant degree of perspective deformation, such that the face in the first face box can be performed with distortion correction. If the length of each side in the second face box and the length of the corresponding side in the first face box do not satisfy the predetermined condition, it can be determined that the face in the first face box has no perspective deformation, or an insignificant degree of perspective deformation, such that it is not necessary to perform distortion correction on the face in the first face box.

For example, the predetermined condition may be "the difference between the lengths being greater than 10 pixels". When the length of a side in the second face box is 100 pixels, and the length of the corresponding side in the first face box is 120 pixels, it can be determined that the length of the side in the second face box and the length of the corresponding side in the first face box satisfy the predetermined condition, such that the distortion correction can be performed on the face in the first face box. In another example, the predetermined condition may be "the ratio of the lengths being smaller than 0.9 or greater than 1.1". When the length of a side in the second face box is 115 pixels, and the length of the corresponding side in the first face box is 100 pixels, it can be determined that the ratio of the length of the side in the second face box to the length of the corresponding side in the first face box is 1.15, which satisfies the predetermined condition. That is, distortion correction can be performed on the face in the first face box.

As block 205, distortion correction is performed on the face in the first face box to generate a corrected image.

For the specific implementation process and principle of the above action at block 205, reference may be made to the detailed description of the above embodiment, and details thereof will be omitted here.

In the method for correcting face distortion according to the embodiment of the present disclosure, face detection is performed on an obtained image to determine a position of each face box included in the image. Based on the position of each face box, it is determined whether each face box is within a predetermined field of view range. Then, in response to at least a part of the first face box being not within the predetermined field of view range, conformal projection is performed on the first face box to generate a second face box. Further, in response to determining that a predetermined condition is satisfied between the second face box and the first face box, distortion correction is performed on the face in the first face box to generate a corrected image. Therefore, by further screening the first face box based on the degree of perspective deformation of the face in the first face box that is completely within the predetermined field of view range, a face that is not within predetermined field of view range and has no perspective deformation can be protected, thereby further improving the effect of face distortion correction and improving the user experience.

In a possible implementation of the present disclosure, while performing distortion correction on the face that is not completely within the predetermined field of view range, a face that is completely within the predetermined field of view can be protected, thereby improving the overall quality of the image after face distortion correction.

A method for correcting face distortion according to embodiments of the present disclosure will be further described below with reference to FIG. 3.

FIG. 3 is a schematic flowchart illustrating yet another method for correcting face distortion according to embodiments of the present disclosure.

As shown in FIG. 3, the method for correcting face distortion includes the following actions at blocks.

At block 301, face detection is determined on an obtained image to determine a position of each face box included in the image.

At block 302, it is determined whether each face box is within a predetermined field of view range based on the position of the face box.

At block 303, distortion correction is performed on a face in a first face box in response to at least a part of the first face box being not within the predetermined field of view range, to generate a corrected image.

For the specific implementation process and principle of the above actions at blocks 301 to 303, reference may be made to the detailed description of the above embodiments, and details thereof will be omitted here.

At block 304, it is determined whether a pixel to be corrected is located within a third face box. Here, the third face box is a face box located within the predetermined field of view range. If so, the method proceeds with action at block 305; or otherwise, the method proceeds with action at block 308.

In an embodiment of the present disclosure, when performing the distortion correction on the face in the first face box, in order to ensure a smooth transition between the face distortion corrected area and the non-corrected area, and make the corrected image more natural, the pixels around the first face box can also be corrected. The pixels around the first face box may fall into the third face box within the predetermined field of view range. Thus, in a possible implementation of the present disclosure, for each pixel to be corrected, it can be first determined whether the pixel to be corrected is located within the third face box, so as to perform protection processing on the pixel to be corrected located within the third face box, to improve the quality of the corrected image.

At block 305, it is determined whether a current correction operation is a translation operation, and if so, the method proceeds with action at block 306; or otherwise, the method proceeds with action at block 307.

The correction operation may be a translation operation, a rotation operation, a twist operation, an interpolation operation, etc., and the embodiment of the present disclosure is not limited to any of these examples.

As a possible implementation, when protecting the face in the third face box, a translation operation may be performed on the pixels in the third face box. Therefore, when it is determined that the pixel to be corrected is located in the third face box, it can be further determined whether the current correction operation is a translation operation, so as to determine whether the pixel to be corrected can be corrected by the current correction operation.

At block 306, the translation operation is performed on the pixel to be corrected.

In an embodiment of the present disclosure, if it is determined that the pixel to be corrected is located in the third face box, and the current correction operation is the translation operation, the translation operation can be performed on the pixel to be corrected according to parameters included in the current correction operation, such as a direction of the translation operation, a length of the translation operation, etc., to complete the correction of the pixel to be corrected.

At block 307, the correction processing for the pixel to be corrected is terminated.

In an embodiment of the present disclosure, if it is determined that the pixel to be corrected is located in the third face box, and the current correction operation is not the translation operation, the correction processing for the pixel to be corrected can be terminated. That is, the pixel to be corrected is not corrected, such that the face in the third face box can be protected.

At block 308, the pixel to be corrected is corrected.

In an embodiment of the present disclosure, if it is determined that the pixel to be corrected is not located in the third face box, the pixel to be corrected can be directly corrected according to the current operation to be corrected. When performing distortion correction on the face in the first face box, the correction process of actions at blocks 304 to 308 needs to be repeated for all the pixels to be corrected, until all the pixels to be corrected have been processed, and then the corrected image is generated.

As a possible implementation, a face protection item can be introduced into the error estimation of face distortion correction, and then the effect of the distortion correction on the face in the first face box and the protection effect of the face that does not need face correction can be measured according to the error estimation of face distortion correction. The error estimation of the face distortion correction with the face protection term introduced can be determined according to Equation (2).

$$E=\Sigma_{i\in k}w_i\|v_i-(S_k u_i+t_k)\|_2^2+\Sigma_{i\in k}w_i\|v_i-(p_i+t_k)\|_2^2 \qquad (2),$$

where E is the error estimation of the face distortion correction with the face protection item introduced, $w_i$ is a weight for the i-th face grid corresponding to the face, $v_i$ is the target face grid obtained by correcting the i-th face grid corresponding to the face, $S_k$ is a similarity transformation matrix, $u_i$ is the conformal projection grid corresponding to the i-th face grid corresponding to the face, $t_k$ is a translation vector, $p_i$ is the i-th face grid corresponding to the face, k is the number of face grids corresponding to the face, and i is an index of the face grids corresponding to the face.

In an embodiment of the present disclosure, if the error estimation E of the face distortion correction with the face protection item introduced is smaller than or equal to a second error threshold, it can be determined the effect of the face distortion correction on the face in the first face box is good, and the protection effect of the face that does not need face distortion correction is also good, such that the face distortion correction process for the face in the first face box can be terminated. If the error estimation E of the face distortion correction with the face protection item introduced is greater than the second error threshold, it can be determined that the effect of the face distortion correction on the face in the first face box is poor, or the protection effect of the face that does not need face distortion correction is poor, such that further face distortion correction can be performed on the face in the first face box until the error estimation E of the face distortion correction with the face protection item introduced is smaller than or equal to the second error threshold.

It is to be noted that, in practice, the specific value of the second error threshold may be predetermined according to actual needs and specific application scenarios, and the embodiment of the present disclosure is not limited to this.

In the method for correcting face distortion according to the embodiment of the present disclosure, face detection is performed on an obtained image to determine a position of each face box included in the image. In response to determining that at least a part of a first face box is not within a predetermined field of view range, distortion correction is performed on the face in the first face box. When the distortion correction is performed, it is determined whether a pixel to be corrected is located within a third face box, and then a translation operation is performed only on the pixel to be corrected that is located within the third face box, and a corresponding correction operation is performed on a pixel to be corrected that is not located in the third face box. Therefore, by only allowing the translation operation to be performed only on the pixel to be corrected that is located within the third face box, the protection effect of the face within the predetermined field of view range can be further improved, thereby improving the quality of the corrected image and improving the user experience.

In order to implement the above embodiments, the present disclosure also provides an apparatus for correcting face distortion.

FIG. 4 is a schematic diagram showing a structure of an apparatus for correcting face distortion according to embodiments of the present disclosure.

As shown in FIG. 4, the apparatus for correcting face distortion 40 includes: a first determining module 41 configured to perform face detection on an obtained image to determine a position of each face box included in the image; a determining module 42 configured to determine whether each face box is within a predetermined field of view range based on the position of the face box; and a correcting module 43 configured to perform distortion correction on a face in a first face box in response to at least a part of the first face box being not within the predetermined field of view range, to generate a corrected image.

In practice, the apparatus for correcting face distortion according to the embodiment of the present disclosure may be configured in any electronic device to execute the above method for correcting face distortion.

In the apparatus for correcting face distortion according to the embodiment of the present disclosure, face detection is performed on an obtained image to determine a position of each face box included in the image. It is determined whether each face box is within a predetermined field of view range based on the position of the face box. Further, in response to at least a part of the first face box being not within the predetermined field of view range, distortion correction is performed on a face in a first face box to generate a corrected image. Therefore, by correcting the face that is not within the predetermined field of view range, the face within the predetermined field of view range can be protected, such that the distorted face can be corrected while protecting the quality of the undistorted face, thereby improving the effect of face distortion correction and improving the user experience.

In a possible implementation of the present disclosure, the above apparatus 40 for correcting face distortion may further include: a projecting module configured to perform conformal projection on the first face box to generate a second face box; and a second determining module configured to determine that a predetermined condition is satisfied between the second face box and the first face box.

Further, in another possible implementation of the present disclosure, the above second determining module may be configured to: determine that a length of at least one side in the second face box and a length of a corresponding side in the first face box satisfy the predetermined condition.

Further, in yet another possible implementation of the present disclosure, the above apparatus 40 for correcting face distortion may further include: a third determining module configured to determine the predetermined field of view range based on attributes of a camera module that captures the image, the attributes of the camera module including a position of the camera module in the terminal and a field of view of the camera module.

In a possible implementation of the present disclosure, the above correcting module 43 may be configured to: determine whether a pixel to be corrected is located within a third face box, the third face box being a face box located within the predetermined field of view range; determine whether a current correction operation is a translation operation in response to the pixel to be corrected being located within the third face box; and translate the pixel to be corrected in response to the current correction operation being the translation operation.

Further, in another possible implementation of the present disclosure, the above correcting module 43 may be further configured to: correct the pixel to be corrected in response to the pixel to be corrected being not located within the third face box.

Further, in yet another possible implementation of the present disclosure, the above correcting module 43 may be further configured to: terminate, in response to the current correction operation being not a translation operation, the correction processing for the pixel to be corrected.

It is to be noted that the above explanation and description of the embodiment of the method for correcting face distortion as shown in FIG. 1, FIG. 2, or FIG. 3 are also applicable to the apparatus 40 for correcting face distortion according to this embodiment, and details thereof will be omitted here.

In the apparatus for correcting face distortion according to the embodiment of the present disclosure, face detection is performed on an obtained image to determine a position of each face box included in the image. In response to determining that at least a part of a first face box being not within a predetermined field of view range, distortion correction is performed on the face in the first face box. When the distortion correction is performed, it is determined whether a pixel to be corrected is located within a third face box, and then a translation operation is performed only on the pixel to be corrected that is located within the third face box, and a corresponding correction operation is performed on a pixel to be corrected that is not located in the third face box. Therefore, by only allowing the translation operation to be performed only on the pixel to be corrected that is located within the third face box, the protection effect of the face within the predetermined field of view range can be further improved, thereby improving the quality of the corrected image and improving the user experience.

In order to implement the above embodiments, the present disclosure also provides an electronic device.

FIG. 5 is a schematic diagram showing a structure of an electronic device according to embodiments of the present disclosure.

As shown in FIG. 5, the electronic device 200 includes: a memory 210, a processor 220, and a bus 230 connecting different components (including the memory 210 and the processor 220). The memory 210 stores a computer program, and the processor 220 is configured to, when executing the program, perform the method for correcting face distortion described in any of the embodiments of the present disclosure.

The bus 230 represents one or more of various types of bus structures, including a memory bus or memory controller, a peripheral bus, a graphics acceleration port, a processor, or a local bus using any of various bus structures. By way of example, these bus structures include, but not limited to, Industry Standard Architecture (ISA) bus, Micro Channel Architecture (MAC) bus, Enhanced ISA bus, Video Electronics Standards Association (VESA) local bus, and Peripheral Component Interconnection (PCI) bus.

The electronic device 200 typically includes a variety of electronic-device-readable mediums. These mediums can be any available mediums that can be accessed by the electronic device 200, including volatile and non-volatile mediums or removable and non-removable mediums.

The memory 210 may also include a computer system readable medium in the form of volatile memory, such as Random Access Memory (RAM) 240 and/or cache memory 250. The electronic device 200 may further include other removable/non-removable, volatile/non-volatile computer system storage mediums. For example only, a storage system 260 may be used to read/write from/to non-removable, non-volatile magnetic mediums (not shown in FIG. 5, commonly referred to as a "hard disk drive"). Although not shown in FIG. 5, a disk drive may be provided for reading/writing from/to removable non-volatile magnetic disks (e.g., "floppy disks"), and an optical drive may be provided for reading/writing from/to removable non-volatile optical discs (e.g., CD-ROM, DVD-ROM, or other optical mediums). In these cases, each drive may be connected to bus 230 through one or more data medium interfaces. The memory 210 may include at least one program product having a set (e.g., at least one) of program modules configured to perform the functions of any of the embodiments of the present disclosure.

A program/utility 280 having a set of (at least one) program modules 270, which may be stored, for example, in the memory 210. Such program modules 270 include, but not limited to, an operating system, one or more application programs, other programs modules and program data, each or any combination of these examples may include an implementation of a network environment. The program module 270 generally performs the functions and/or method according to any of the embodiments described in the present disclosure.

The electronic device 200 may also communicate with one or more external devices 290 (e.g., a keyboard, a pointing device, a display 291, etc.), with one or more devices that enable a user to interact with the electronic device 200, and/or with any device (e.g., a network card, a modem, etc.) that enables the electronic device 200 to communicate with one or more other computing devices. Such communication may take place through an input/output (I/O) interface 292. Also, the electronic device 200 may communicate with one or more networks (e.g., a Local Area Network (LAN), a Wide Area Network (WAN), and/or a public network such as the Internet) through a network adapter 293. As shown, the network adapter 293 communicates with other modules of the electronic device 200 via the bus 230. It can be appreciated that, although not shown, other hardware and/or software modules may be used in conjunction with the electronic device 200, including but not limited to: microcodes, device drivers, redundant processing units, external disk drive arrays, RAID systems, tape drives and data backup storage systems.

The processor 220 executes various functional applications and data processing by executing programs stored in the memory 210.

It is to be noted that, for the implementation process and technical principle of the electronic device in this embodiment, reference may be made to the above explanation and description of the method for correcting face distortion in the embodiment of the present disclosure, and details thereof will be omitted here.

The electronic device according to the embodiment of the present disclosure can perform the above method for correcting face distortion. Face detection is performed on an obtained image to determine a position of each face box included in the image. It is determined whether each face box is within a predetermined field of view range based on the position of the face box. Further, in response to at least a part of the first face box being not within the predetermined field of view range, distortion correction is performed on a face in a first face box to generate a corrected image. Therefore, by correcting the face that is not within the predetermined field of view range, the face within the predetermined field of view range can be protected, such that the distorted face can be corrected while protecting the quality of the undistorted face, thereby improving the effect of face distortion correction and improving the user experience.

In order to implement the above embodiments, the present disclosure further provides a computer-readable storage medium.

Here, the computer-readable storage medium has a computer program stored thereon. The program, when executed by a processor, implements the method for correcting face distortion described in any of the embodiments of the present disclosure.

In order to implement the above embodiments, another embodiment of the present disclosure provides a computer program, which, when executed by a processor, implements the method for correcting face distortion described in any of the embodiments of the present disclosure.

In an optional implementation, any combination of one or more computer-readable mediums can be used in embodiments of the present disclosure. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, as a non-exhaustive list: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof.

The computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device.

The program codes stored on the computer-readable medium may be transmitted via any appropriate medium, including but not limited to wireless medium, electric cable, optical cable, Radio Frequency (RF), or any suitable combination thereof.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user electronic device, partly on the user electronic device, as a standalone software package, partly on the user electronic device and partly on a remote electronic device, or completely on the remote electronic device or server. In a case where the remote electronic device is involved, the remote electronic device may be connected to the user electronic device through any types of network, including a Local Area Network (LAN) or a Wide Area Network (WAN), or to an external electronic device (e.g., over the Internet by using an Internet service provider).

Other embodiments of the present disclosure may be readily envisaged by those skilled in the art after considering the description and practicing the present disclosure. The present disclosure is intended to cover any variants, uses, or adaptations of the present disclosure without departing from the general principles of the present disclosure and the common knowledge or conventional techniques in the related art. The description and embodiments are to be regarded as exemplary only, and the scope and spirit of the present disclosure are defined by the claims.

It can be appreciated that the present disclosure is not limited to the exact structures described above and illustrated in the accompanying drawings, and that various modifications and changes may be made without departing from the scope of the present disclosure, which is defined only by the claims as attached.

What is claimed is:

1. A method for correcting face distortion, comprising:
    performing face detection on an obtained image to determine a position of each face box included in the image;
    determining whether each face box is within a predetermined field of view range based on the position of the face box; and
    performing distortion correction on a face in a first face box in response to at least a part of the first face box being not within the predetermined field of view range, to generate a corrected image,
    wherein said performing the distortion correction on the face in the first face box comprises:
    determining whether a pixel to be corrected is located within a third face box, the third face box being a face box located within the predetermined field of view range;
    determining whether a current correction operation is a translation operation in response to the pixel to be corrected being located within the third face box; and
    translating the pixel to be corrected in response to the current correction operation being the translation operation.

2. The method according to claim 1, further comprising, prior to performing the distortion correction on the face in the first face box:
    performing conformal projection on the first face box to generate a second face box; and
    determining that a predetermined condition is satisfied between the second face box and the first face box.

3. The method according to claim 2, wherein said determining that the predetermined condition is satisfied between the second face box and the first face box comprises:
    determining that a length of at least one side in the second face box and a length of a corresponding side in the first face box satisfy the predetermined condition.

4. The method according to claim 1, further comprising, subsequent to determining whether the pixel to be corrected is located within the third face box:
    correcting the pixel to be corrected in response to the pixel to be corrected being not located within the third face box.

5. The method according to claim 4, further comprising, subsequent to determining whether the current correction operation is a translation operation:
    terminating, in response to the current correction operation being not the translation operation, a correction process for the pixel to be corrected.

6. An electronic device, comprising: a memory, a processor, and a program stored in the memory and executable on the processor, wherein the processor is configured to, when executing the program:
    perform face detection on an obtained image to determine a position of each face box included in the image;
    determine whether each face box is within a predetermined field of view range based on the position of the face box; and
    perform distortion correction on a face in a first face box in response to at least a part of the first face box being not within the predetermined field of view range, to generate a corrected image,
    wherein the processor is further configured to, when executing the program: determine whether a pixel to be corrected is located within a third face box, the third face box being a face box located within the predetermined field of view range;
    determine whether a current correction operation is a translation operation in response to the pixel to be corrected being located within the third face box; and
    translate the pixel to be corrected in response to the current correction operation being the translation operation.

7. The electronic device according to claim 6, wherein the processor is further configured to, when executing the program:
    perform conformal projection on the first face box to generate a second face box; and
    determine that a predetermined condition is satisfied between the second face box and the first face box.

8. The electronic device according to claim 7, wherein the processor is further configured to, when executing the program:
    determine that a length of at least one side in the second face box and a length of a corresponding side in the first face box satisfy the predetermined condition.

9. The electronic device according to claim 6, wherein the processor is further configured to, when executing the program, subsequent to determining whether the pixel to be corrected is located within the third face box:
    correct the pixel to be corrected in response to the pixel to be corrected being not located within the third face box.

10. The electronic device according to claim 9, wherein the processor is further configured to, when executing the program:

terminate, in response to the current correction operation being not the translation operation, a correction process for the pixel to be corrected.

11. A non-transitory computer-readable storage medium having a computer program stored thereon, the computer program, when executed by a processor, implementing a method for correcting face distortion, comprising:
performing face detection on an obtained image to determine a position of each face box included in the image;
determining whether each face box is within a predetermined field of view range based on the position of the face box; and
performing distortion correction on a face in a first face box in response to at least a part of the first face box being not within the predetermined field of view range, to generate a corrected image,
wherein said performing the distortion correction on the face in the first face box comprises:
determining whether a pixel to be corrected is located within a third face box, the third face box being a face box located within the predetermined field of view range;
determining whether a current correction operation is a translation operation in response to the pixel to be corrected being located within the third face box; and
translating the pixel to be corrected in response to the current correction operation being the translation operation.

12. The non-transitory computer-readable storage medium according to claim 11, wherein the method further comprises, prior to performing the distortion correction on the face in the first face box:
performing conformal projection on the first face box to generate a second face box; and
determining that a predetermined condition is satisfied between the second face box and the first face box.

13. The non-transitory computer-readable storage medium according to claim 12, wherein said determining that the predetermined condition is satisfied between the second face box and the first face box comprises:
determining that a length of at least one side in the second face box and a length of a corresponding side in the first face box satisfy the predetermined condition.

14. The non-transitory computer-readable storage medium according to claim 11, wherein the method further comprises, subsequent to determining whether the pixel to be corrected is located within the third face box:
correcting the pixel to be corrected in response to the pixel to be corrected being not located within the third face box.

* * * * *